(12) United States Patent
Garner et al.

(10) Patent No.: US 6,699,529 B2
(45) Date of Patent: Mar. 2, 2004

(54) METHOD FOR COATING VEHICULAR RADIATORS WITH OZONE DEPLETING SLURRY CATALYST

(75) Inventors: James William Garner, Harvest, AL (US); Donald Allan Craig, New Hope, AL (US); Jeffrey Barmont Hoke, North Brunswick, NJ (US); Dieter Lischitzki, Nuestadt (DE)

(73) Assignee: Engelhard Corporation, Iselin, NJ (US)

( * ) Notice: Subject to any disclaimer, the term of this patent is extended or adjusted under 35 U.S.C. 154(b) by 46 days.

(21) Appl. No.: 10/151,460

(22) Filed: May 20, 2002

(65) Prior Publication Data

US 2003/0215576 A1 Nov. 20, 2003

(51) Int. Cl.$^7$ .................................................. B05D 1/02
(52) U.S. Cl. .................. 427/427; 427/299; 427/314; 427/372.2; 427/402; 427/419.2; 427/421
(58) Field of Search ................... 427/427, 299, 427/314, 372.2, 402, 419.2, 421

(56) References Cited

U.S. PATENT DOCUMENTS

| | | |
|---|---|---|
| 2,877,714 A | 3/1959 | Sorg et al. |
| 3,358,609 A | 12/1967 | Worth et al. |
| 3,738,088 A | 6/1973 | Colosimo |
| 4,671,792 A | 6/1987 | Borsanyi |
| 4,688,595 A | 8/1987 | Srebnik et al. |
| 4,728,265 A | 3/1988 | Cannon |
| 5,250,027 A | 10/1993 | Lewis et al. |
| 5,340,562 A | 8/1994 | O'Young et al. |
| 5,422,331 A | 6/1995 | Galligan et al. |
| 6,062,829 A | 5/2000 | Ognier |
| 6,190,627 B1 | 2/2001 | Hoke et al. |
| 6,340,066 B1 | 1/2002 | Dettling et al. |

FOREIGN PATENT DOCUMENTS

| | | |
|---|---|---|
| DE | 440 07 965 C2 | 10/1994 |
| WO | WO 00/13772 | 3/2000 |
| WO | WO 00/13773 | 3/2000 |
| WO | WO 00/13790 | 3/2000 |

*Primary Examiner*—Bernard Pianalto
(74) *Attorney, Agent, or Firm*—Russell G. Lindenfeldar

(57) ABSTRACT

A method for coating vehicular radiators with an ozone depleting manganese oxide catalyst in slurry form utilizes a robotic arm with multiple spray heads for spraying the face of the radiator. Each head is in fluid communication with its own dedicated peristaltic pump. The pumps are independently valved into and out of fluid communication with select heads as a function of the spray pattern effected by robotic arm movement.

25 Claims, 5 Drawing Sheets

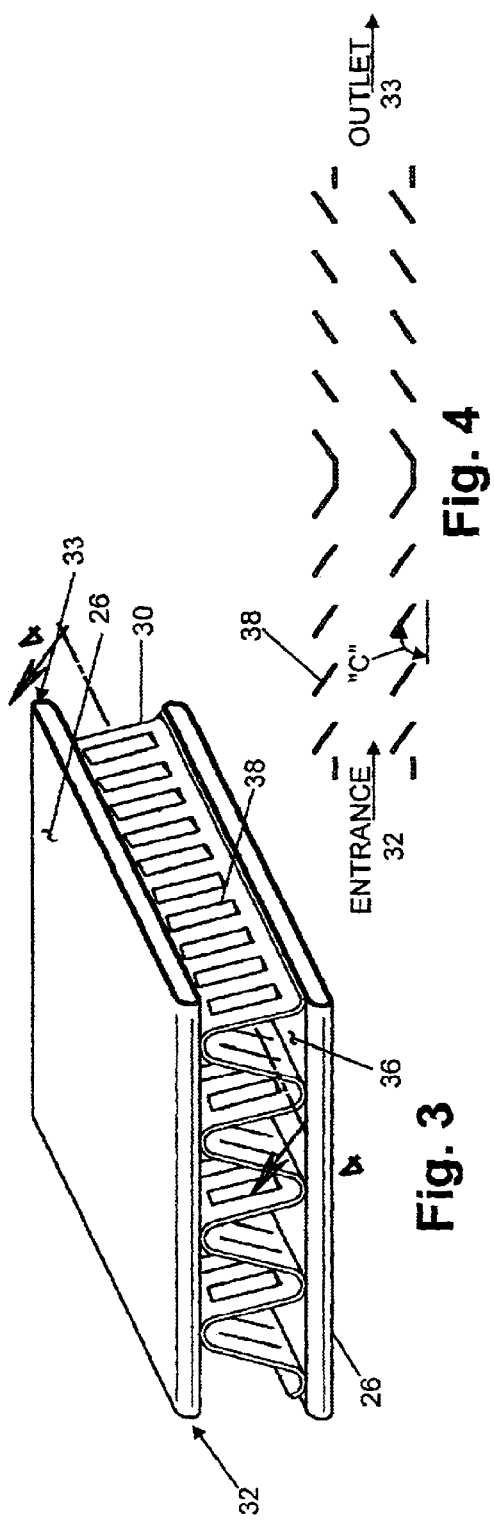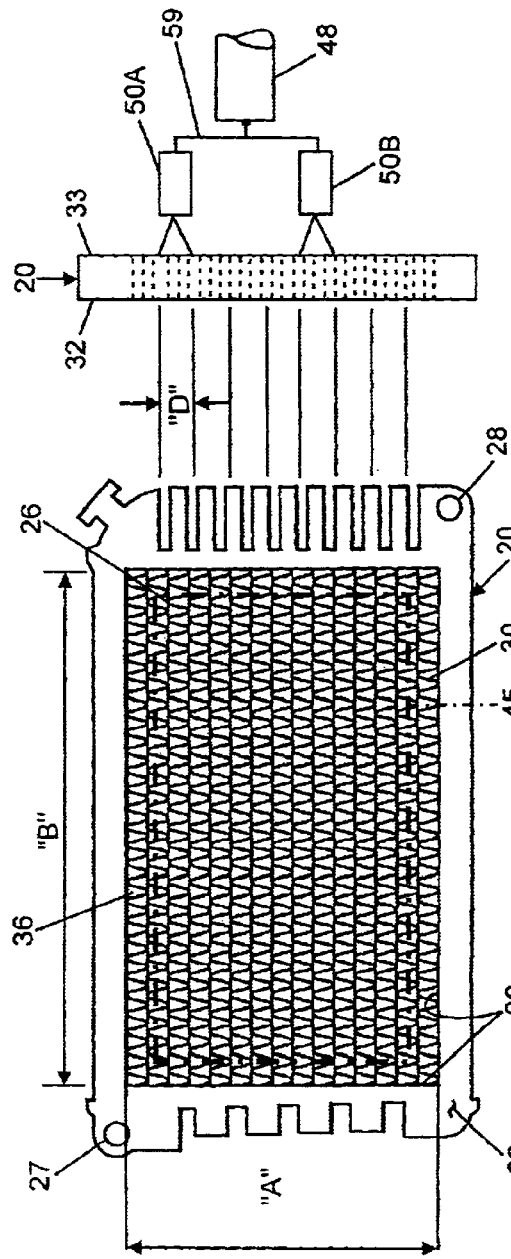

METHOD FOR COATING VEHICULAR RADIATORS WITH OZONE DEPLETING SLURRY CATALYST

FIELD OF THE INVENTION

This invention relates to a method for applying an atmosphere purifying catalyst to a heat exchanger and more particularly to a method for applying a manganese oxide ozone depleting catalyst to vehicular radiators and like heat exchangers.

BACKGROUND OF THE INVENTION

Ozone treating catalyst compositions are well known in the art. Such compositions include manganese oxides, especially manganese dioxide alone or in combinations with copper oxide and aluminum oxide. Precious metal-containing materials are also known to decompose ozone. Reference can be had to assignee's U.S. Pat. Nos. 5,422,331 and 6,340,066 and assignee's PCT publications WO 00/13772; 00/13773; and 00/13790, all of which are incorporated by reference herein so that details relating to the composition and formulation of the ozone depleting catalyst need not be set forth in detail herein. The compositions of the manganese oxide catalysts as shown by these references have been developed and refined to the extent that thin layers of the catalyst can adhere to metal substrates subject to vibrations encountered in a vehicular application.

The prior art has recognized the benefit of applying air purifying catalysts and the like on moving vehicular heat exchange surfaces (such as those formed on vehicular radiators, oil coolers and air conditioning units) for purifying the atmosphere. See German Patent No. DE 40 07 965 C2. See also, U.S. Pat. No. 3,738,088 and the '066 patent. While the published prior art clearly discloses that vehicular heat exchangers, specifically radiators, can be coated with a manganese oxide ozone depleting catalyst, there is little published literature teaching how such coating is to be applied.

The primary purpose of a vehicular radiator or any vehicular air-to-liquid heat exchanger is to effectively cool the liquid coolant circulating through the heat exchanger. As is well known, liquid coolant circulates through tubes which have corrugated foil or fins between adjacent tubes through which cooling air flows. The fins have thin slits, or louvers, punched therein at a precise angle to enhance cooling. If the spaces between fins or the louvered openings are closed by the coating the radiator cannot achieve its design efficiency.

At the same time, governmental agencies have recently recognized the benefits to the environment which can be achieved by moving vehicles equipped with ozone depleting catalysts (as well as other atmosphere purifying catalysts). Accordingly, some governmental agencies have, or are, contemplating extending environmental credits to automobile manufacturers who have equipped their vehicles with ozone depleting catalysts which may be used to offset certain polluting emissions produced by the vehicle's internal combustion engine. The credits are or will be based on the total heat exchange area of the radiator or other heat exchange device. Thus, to achieve maximum environmental benefit for the catalyst coated heat exchanger, the entire heat exchanger area is to be coated with the ozone depleting catalyst. At the same time, the coating cannot be applied in a manner which could clog very small spaces within the radiator necessary for the radiator to achieve its cooling capacity.

The assignee has developed a system for coating vehicular radiators with a manganese oxide ozone depleting catalyst which has produced commercially acceptable radiators coated with an ozone depleting substance. The system is diagrammatically illustrated in prior art FIG. 1 and resembles an automated vehicular paint line. A robotic arm 1 carries a spray head 2 and moves the spray head in a horizontal, vertically indexed spray pattern. A peristaltic pump 3 is connected to a manganese oxide slurry vat 4 which is agitated and valved into communication with spray head 2. Spray head 2 also receives pressurized air 5 to produce an atomized slurry spray directed against one face side of the radiator. The system is a recirculating system as shown. When the slurry is not being pumped to the spray head 2 it is recirculated to the slurry vat 4.

In the overall process, the radiators are initially identified, initially weighed and cleaned in a power wash station 6. The radiators are then dried and again weighed at drying station 7. The radiators are now ready for coating. Because the manufacturers do not desire the frame to be coated for any number of reasons (for example, assembly fit or aesthetics) and the frame does not "see" air flow (and consequently does not deplete ozone), the radiator frame is masked at station 8 so that only the radiator window containing the tubes and fins is exposed. Masking typically has been accomplished by tape, although in some instances fixtures or grippers blocking off the frame or certain portions of the frame (in combination with the tape) have been used. The radiator fin window is then sprayed at station 9 on one face after aligning the radiator in a fixture. An air knife follows the spray to assure penetration of the slurry at least to the center of the radiator core. The radiator is rotated 180° to expose the opposite face, aligned and sprayed in the horizontal sweep vertically indexed pattern to coat the radiator fin window on the opposite face. The radiator is then dried and weighed at station 10. Weight increase is attributed to catalyst deposition and checked against a desired catalyst loading range. The assumption is that the catalyst has been uniformly dispersed throughout the surface area of the radiator fin window. The system as described works and successfully coats radiators.

SUMMARY OF THE INVENTION

This invention is directed to improvements in the ozone depleting catalyst spray system as described above which increases throughput, improves coating consistency and assures system repeatability.

This feature of the invention is achieved in a method for applying an ozone depleting coating of manganese oxide to a vehicular radiator having a frame, a plurality of tubular conduits within the frame for carrying a coolant and corrugated foil or fins between the conduits having louvers formed therein. The method includes the steps of providing an agitated vat containing a slurry of manganese oxide. Also provided is a plurality of spray heads mounted in spaced relationship on a robotic arm that is movable relative to the radiator. Each spray head is provided with a source of pressurized air regulated by flow and/or pressure when valved into fluid communication with any given spray head. The method provides that for each spray head, a separate peristaltic pump for pumping the slurry from the vat to an associated spray head is utilized with each pump independently controlled to operate at a generally constant speed. The pressurized air and the slurry from the peristaltic pumps are independently valved into fluid communication with the spray heads to produce an atomized, fan-shaped slurry spray from each spray head and the valving step is maintained for a set time sufficient to allow the robotic arm to complete a set movement pattern for spraying one face side of the radiator with the slurry penetrating to at least the center of the fins. The valving for the set time is then repeated for spraying the opposite face side of the radiator whereby the time to coat a radiator face side is reduced while the arrangement of a separate peristaltic pump for each spray head assures a consistent catalyst loading applied to the surface area of the radiator.

In accordance with another aspect of the invention, one of the spray heads is set to produce an elliptical spray pattern and the robotic arm is programmed to move the elliptical pattern spray head in horizontal and vertical passes so that the spray head producing the elliptical spray pattern coats the peripheral edge of the radiator window without coating tanks, side or header plates while fluid communication of the slurry to the other spray heads is stopped whereby masking of the radiator is alleviated and catalyst waste is minimized.

In accordance with a more specific aspect of the invention, the spray pattern includes programming the arm movement to index the spray heads vertically up or down at the completion of a horizontal sweep of the arm. The horizontal sweep extends from a position adjacent one side of the window to a position adjacent the opposite side of the window and the spray pattern is generally conical with the vertical index step at least slightly less than the diameter of the spray pattern at the face surface (spray plume) of the radiator. The plurality of the spray heads include at least a first and second spray head with the second spray head positioned at a set distance below the first spray head and the indexing steps continue until one of the spray heads is vertically indexed to the vertical position occupied by the other spray head at the start of the spray cycle.

In accordance with yet another aspect of the invention, because the method uses a dedicated peristaltic pump for each spray head, select pumps are valved into fluid communication with their associated spray heads or out of fluid communication with the spray heads whereupon the pump slurry is returned to the slurry vat without adversely affecting catalyst loading on the radiator. Accordingly, any number of arm movements correlated with independent control of select spray heads can be programmed into the method to permit a large number of different radiator sizes, designs and configurations to be efficiently coated with the manganese oxide catalyst using one arm with multiple spray heads.

In accordance with the invention's broader scope, an improved method of spraying any catalyst in slurry form onto an object is provided.

In general summary, the invention is an improved ozone depleting catalyst spray system for vehicular heat exchangers which has one or more, or any combination, of the following:

A) higher throughput;
B) consistency in coating applied to radiator window;
C) minimal catalyst waste;
D) independent spray head control for enhanced versatility;
E) elimination or minimizing masking; and/or,
F) repeatability or robustness in system operation.

These and other objects, features and advantages of the invention will become apparent to those skilled in the art upon reading and understanding the Detailed Description of the Invention set forth below taken in conjunction with the drawings.

BRIEF DESCRIPTION OF THE DRAWINGS

The invention may form in certain parts and in an arrangement of certain parts taken together and in conjunction with the attached drawings which form a part of the invention and wherein:

FIG. 3 is a pictorial representation of the corrugated foil or fins of a vehicular radiator;

FIG. 4 is a section of the radiator fin taken generally along lines 4—4 of FIG. 3;

FIG. 5A is a front view of a generic radiator;

FIG. 5B is a schematic side view of the radiator of FIG. 5A with the spray heads positioned to start the spray of a radiator face surface;

DETAILED DESCRIPTION OF THE INVENTION

Figure 1:
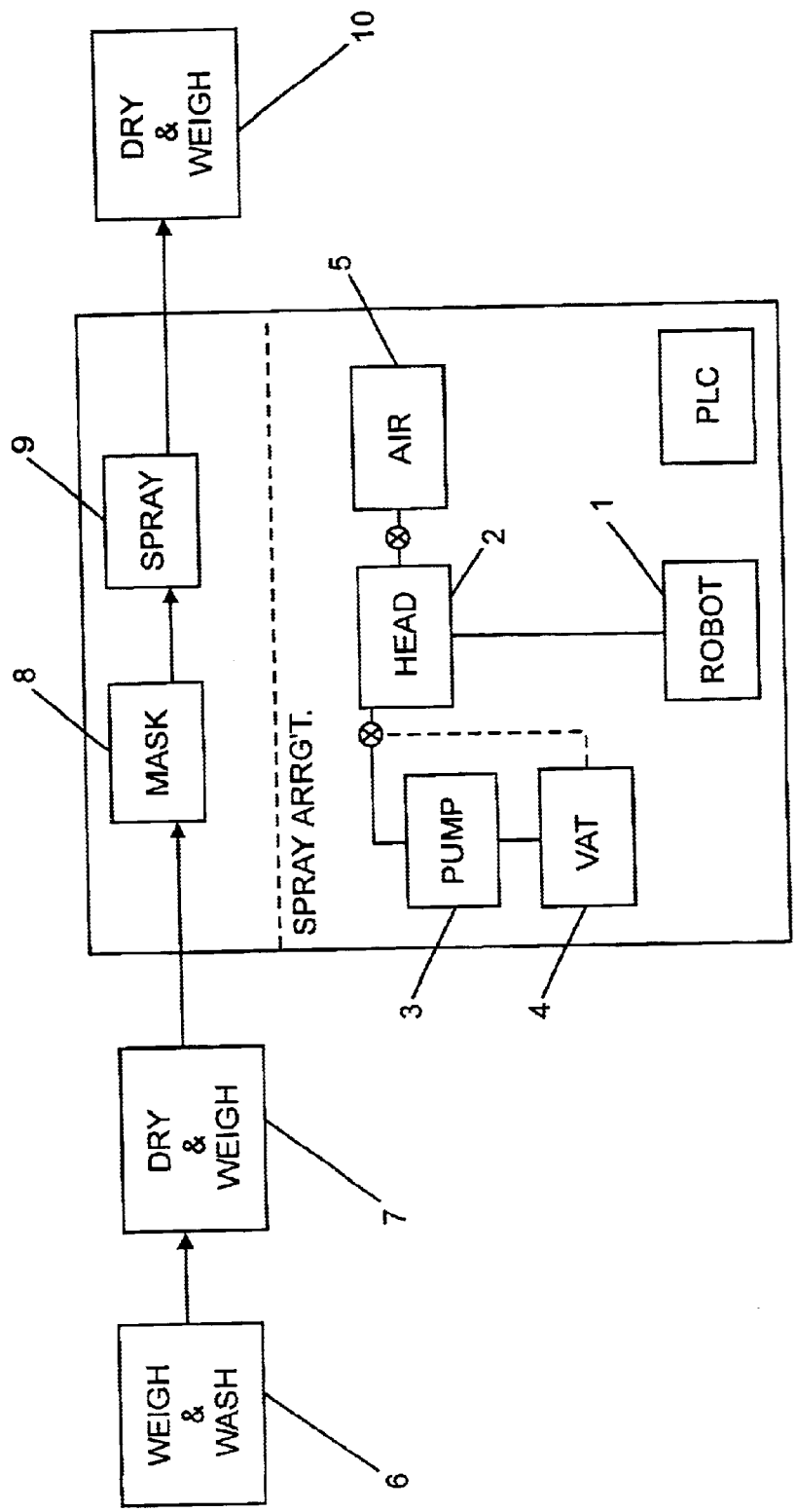
FIG. 1 is a schematic representation of a prior art manganese oxide spray coating system.

Referring now to the drawings wherein the showings are for the purpose of illustrating a preferred embodiment of the invention only and not for the purpose of limiting same, the overall system of the present invention follows the prior art spray system disclosed in FIG. 1. That is, the radiators, whether new or used, at the first station 6 are initially identified (assigned an identification number which tracks the radiator throughout the process and which is supplemented with inputted process data), weighed and washed. Weighing the radiator before washing has been accomplished using a Mettler-Toledo SB12001 weigh scale with a capacity of 12 kilograms. The radiator is weighed by placing the radiator side plate on the scale platform. The weight is recorded to the nearest 0.1 gram. Weighing before washing is important to insure that the radiator is totally dry after washing. It also gives the initial raw weight before coating so that the coating weight can be calculated. The radiators are then washed using an appropriate washing solution such as 2% or less ZEP X-9898 in water. In one embodiment of the invention, this is accomplished using a Landa brand power washer by applying the detergent at a rate of approximately 50 to 100 ml/min at 70 psi until the radiator is saturated from both sides. The soap is allowed to soak for 5 minutes before rinsing. Washing is important to remove flux, oil, or any unknown foreign material from the radiator. This will help insure that the manganese oxide coating adheres evenly to all parts of the radiators and has the same coatability within each radiator lot.

Still within first station 6, the radiators are rinsed after washing. In one embodiment of the invention, de-ionized water is used for rinsing. This is accomplished by spraying the radiators with a power washer at flow rate of 6,500 to 7,000 ml/min up to 1500 psi liquid pressure. A 2 to 3 inch plume diameter is used with a stand off distance of 12 inches. The radiator is rinsed from each side. This process is repeated 3 times for brazed radiators which has been found sufficient to remove all soap bubbles by the last rinse. Rinsing is important to remove flux, oil, any unknown foreign material and detergent from the radiator. Like washing, rinsing helps to insure that the manganese oxide coating adheres evenly to all parts of the radiators and has the same coatability within each radiator lot. Prior to drying in station 7, the radiators are air knifed to remove excess water from the core and to therefore reduce the drying time. In one embodiment, this is done by hand at 90 psi using a Winjet model number 727 air knife. The air knife is held approximately 25 mm from the radiator, and it is passed back-and-forth across the face of the radiator in a side-to-side motion. The entire radiator should be covered with the air knife from the top to the bottom in about 30 passes, or until the majority of the water is blown from the radiator. The radiator is then turned around and the other side of the core is air knifed in the same manner.

Drying of the radiators after washing and air-knifing is accomplished in drying station 7. Drying is accomplished in one of the embodiments of the invention by an electrically heated box furnace using recirculating air at temperatures typically between 90° and 110° C. until 100% of the water is removed. Direct heating by natural gas should not be used. Specifically, the byproducts of gas combustion are contaminants that could negatively impact adhesion of the coating on the aluminum surface. Satisfactory drying (removing 99% of the water) has been accomplished at temperatures of 90 to 110° C. for approximately 30 minutes. Because it is important, for coating adhesion and other reasons, to make sure the wash and rinse water has been removed, each radiator is weighed at drying station 7 and checked against its initial weight.

After drying the radiators are coated in a manner which will be described in detail below. After coating the radiators are then weighed and dried at station 10. Drying is accomplished in one of the embodiments by an electrically heated box furnace using recirculating air at temperatures typically between 90 and 110° C. until 100% of the slurry water is removed. Conceptually, all slurry water (at least 99%) has to be removed prior to final weighing. In mass production applications using the invention, the final drying and weighing steps can take several forms. A fixed drying time can be established at the beginning of a production run, by weighing the radiator after drying for an initial time, i.e., about 15 minutes and then re-weighing the radiator after continued drying for an additional time, i.e., about 5 minutes. When the weight no longer changes, drying is complete and the drying time is established for the production lot being processed. The catalyst is applied as a loading of dry coating expressed as the weight of any coating per unit volume, i.e., $g/in^3$. The desired loading of dry coating is calculated from the total geometric surface area, including the geometric area of the corrugated foils or fins, and the volume of the radiator. More specifically, the loading is calculated on the basis of the frontal area of the radiator times the depth or axial length of the radiator in the direction of air flow. The system and method as described thus far is conventional.

Referring now to FIGS. 3, 4, 5A and 5B, the construction of a generic vehicular radiator 20 is generally disclosed. Conceptually, radiator 20 has what will be called a frame 22 (which includes what is conventionally termed "tanks", "side plates" or "headers") the interior of which defines an opening that will be called (for definition or terminology purposes) a radiator window 23. In the generic radiator 20 illustrated in FIG. 5A, the periphery of radiator window 23 is rectangular and indicated by dimensions "A" and "B". Within the opening or radiator window 23 a plurality of tubular conduits 26 extend and tubular conduits 26 are in fluid communication with the hollow space in tanks formed by radiator frame 22.

As is well known, engine coolant, typically liquid in a heated state, enters tanks in radiator frame 22 at an inlet 27 and travels through one or more tubular conduits 26 before exiting radiator 20 through an outlet 28 in a cooler state resulting from wind flow passing by tubular conduits 26 caused either by vehicle motion and/or the vehicle's radiator fan. To enhance the cooling capacity of radiator 20, a foil in corrugated form hereinafter referred to as a radiator fin 30 is positioned between adjacent tubular conduits 26 and extends from the front face side 32 to the rear face side 33 of radiator 20 forming small through channels 36. Fins 30 generally take a sinusoidal shape and contact at each apex of the sine wave a tubular conduit 26. Thus, fins 30 which are cooled by convection are in a conduction heat transfer relationship with tubular conduits 26. Important to the heat transfer efficiency of the radiator are the slits or louvers 38 formed in fins 30 as best shown in FIGS. 3 and 4. Louvers 38 are typically at angles of about 21° to 23° relative to the body of the fin as indicated by angle C in FIG. 4. The air flow through sine shaped fin channels 36 may tend to be laminar but for the louvers which deflect the air stream promoting a turbulent condition to enhance convective heat transfer. Thus, while the coating system of the present invention, in one sense, could be applied to any number of articles, the presence of louvers 38, which conceptually are simply slits with metal bent therefrom, distinguish this heat exchange application from almost all others. Simply put, if the catalyst coating blocks louvers 38, which are slits, the heat transfer efficiency of radiator 20 will be adversely affected in a material way and if louvers 38 are not coated, a significant area of the catalyst will not have the ozone depleting substance. As a matter of definition and as used herein, radiator means a gas-to-liquid (conceptually also a gas-to-gas) heat exchanger which has fins with louvers as described. Vehicular radiator means the radiator is subjected to automotive service and, as such, is subjected to the harsh environment that vehicles are exposed to as well as the severe operating conditions imposed by the vehicle on any component part used in that vehicle. The vehicular application of the radiator indirectly affects the invention because the manganese oxide catalyst has to be formulated and coated with a loading sufficient to withstand the environmental constraints of the vehicle application. This loading expressed in volume can be between from about 0.2 to 0.7 $g/in^3$ and preferably between from about 0.3 to 0.6 $g/in^3$. Alternatively, the loading can be expressed as a surface area coating, $g/m^2$.

Figure 6:
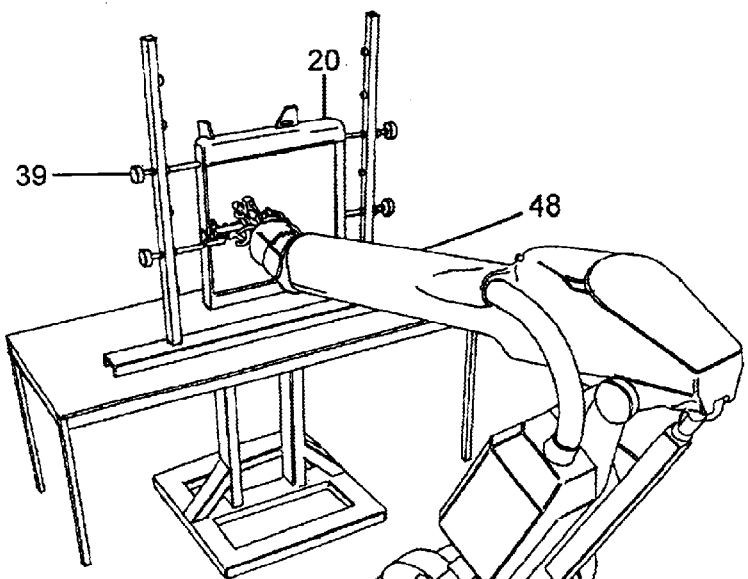
FIG. 6 is a perspective view of the robotic arm of the invention.

Radiator 15 illustrated in FIGS. 3–5 is a generic illustration of a brazed radiator and those skilled in the art will recognize the many variations in radiator design such as mechanically expanded radiators to which this invention is applicable. For reference purposes, the orientation of fins 30 will be such in any radiator so that one end of channel 36 will be termed front face 32 and the opposite end of channel 36 will be termed rear face 33. As described below, the spray pattern of this invention will be directed through channels 36 from front face 32 to rear face 33 or from rear face 33 to front face 32. The coating system will use fixtures such as indicated by reference numeral 39 to place the radiator in this type of alignment (See FIG. 6). Fixtures 39 or equivalent aligning structure will mount the radiator to assure vertical alignment (as shown in FIG. 5B) and horizontal alignment (as shown by dimension "A" in FIG. 5A) of the radiator during spraying.

The thickness of channels 36 or the depth of the radiator can vary anywhere from about ½" to as deep as 6–7" although most vehicular radiators range from about ⅝" to 1½" in depth and, more preferably, from about ⅝" to 1" in depth. The thickness of the radiator and the spacing and shape of channels 36 are variables that must be taken into account when coating the radiator with manganese oxide coatings. In addition, there are any number of radiator designs that conceptually can vary the radiator thickness or depth of channels 36 or vary the shape of window opening 23 and which require adjustments in the coating process. For example, the engine coolant radiator may have an engine oil cooler for vehicles that are subjected to severe service or are high performance automobiles. The oil cooler (radiator or condenser) could be placed beneath the engine coolant radiator or could be piggy-backed behind it, effectively increasing the radiator thickness. In either instance, additional coating parameters have to be taken into account. That is, radiator window 23 does not have to be consistent in its length or width and the depth of channels 36 can vary. Any variation, however, has to be accounted for when coating radiator 20.

Figure 2:
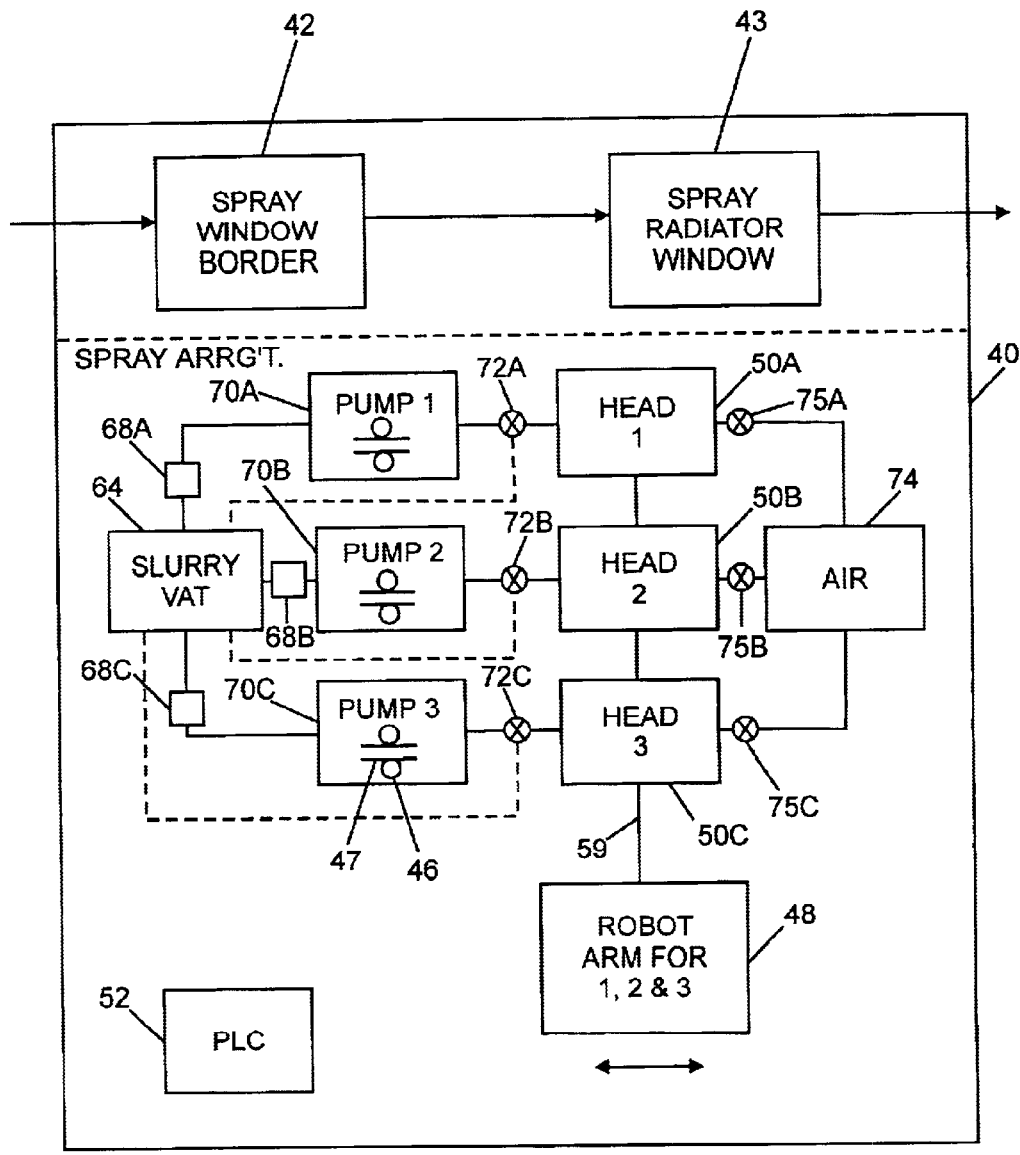
FIG. 2 illustrates a portion of the spray coating system illustrated in FIG. 1 but modified in accordance with the invention.

Referring now to FIG. 2, there is schematically shown a spray arrangement 40 of the present invention which performs the functional steps of spraying a margin or border about the periphery of window 23 at spray window periphery station 42 and spraying the radiator window 23 at spray window station 43. Note that while the radiator window 23 is coated in the prior art and in the present invention, the manner in which the radiator window 28 is sprayed is different than what was done previously and there is no masking step.

The mechanism for spraying is schematically illustrated in FIG. 2 and fundamentally comprises the same components for spraying as illustrated in FIG. 1 but the components are arranged differently.

In particular, there is a robot or a robotic arm 48 on which is mounted a plurality of spray heads 50. In the embodiment illustrated in FIG. 2, there are three spray heads designated 50A, 50B and 50C and in the schematic illustration of FIG. 5B and the pictorial representation of FIG. 8, only two spray heads 50A, 50B are shown for drawing clarity. Any number of spray heads 50 can be used in the invention so long as a plurality of spray heads are used, i.e., two or more.

Robotic arm 48 can and does move parallel to the direction of work flow of radiators 20 through spray arrangement 40. That is, as the radiators are being conveyed through spray arrangement 40 from left to right as viewed in FIG. 2, robotic arm 48 is also moving in a direction from left to right and at the completion of the spray step, indexes from right to left to begin coating the next successive radiator. In a prototype or small job order application, a batch of radiators can be sequentially sprayed on one face thereof and when the last radiator in the batch is sprayed, the radiators are flipped to expose the opposite face surface and travel from right to left as viewed in FIG. 2 to complete spraying thereof. Alternatively, each radiator, front and rear, can be sprayed individually. Robotic arm 48 will then reverse its movement as it sprays the opposite face surfaces of the radiators. While the spray head is continuously coating radiator window face surfaces, the overall methodology is a batch treatment because a limited number of radiators are continuously processed. It is, of course, to be understood that in a mass production system for large orders, a plurality of robotic arms with a plurality of spray heads 50 are provided to direct the sprays at the front and rear faces 32, 33 and the overall process is continuous, i.e., the ovens at stages 7 and 8 and wash station 6 continuously process radiators which serially pass therethrough.

In the preferred embodiment, robotic arm 48 is a conventional industrial robot supplied by ABB Automation. Its activities are programmed by software installed in a PLC (programmable logic controller) 52 supplied with robot 48. In fact, PLC 52 functions as a central process computer generating command and control signals regulating the operation of all valves and other components in the system. The other components may also be intelligent and have their own PLCs controlling their operation in response to the command signals generated by PLC 52.

Figure 8:
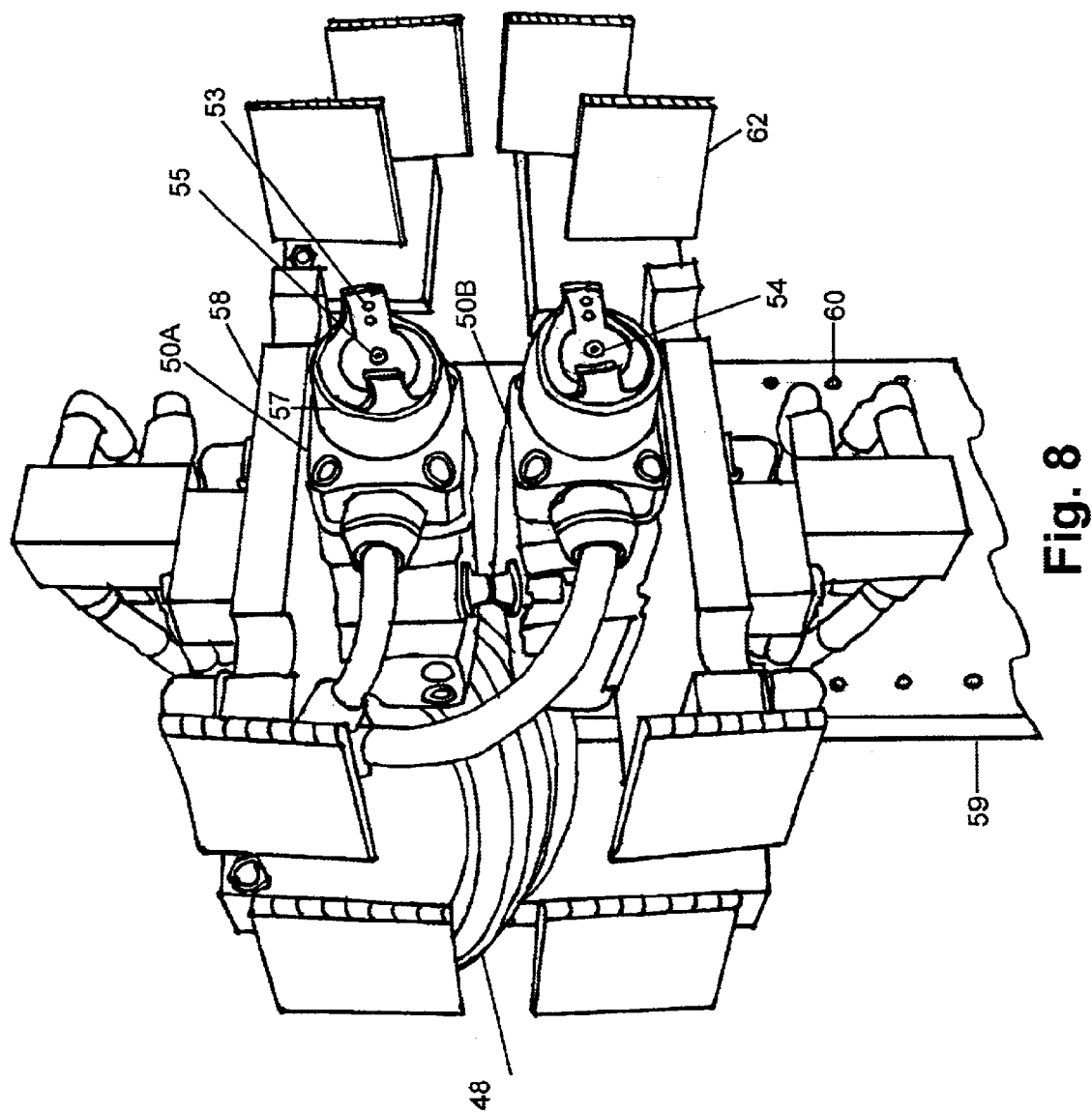

Spray heads 50 are conventional, automatic spray guns and in the preferred embodiment are Ecco 70A spray heads supplied by Ecco Finishing AB. This spray gun was developed by Ecco for spray painting robot installations. As pictorially depicted in FIG. 8, each spray head has four fan air distribution outlets 53, a central atomizing air outlet 54, and a material outlet 55 ("within" atomizing air outlet 54) with needle flow control. In fact, spray head 50 can have a signal-out indicative of the needle position in material outlet 55 for feedback control. One of the characteristics of this particular gun is that its air cap 57 which has four fan air distribution outlets 53 (spaced approximately 3 inches across and offset between 1 and 2 inches from the spray head in the Y direction) is removable without any necessity to remove the hose attachments because the hoses and the spray head are connected to the same mounting plate 58. Thus, an air cap producing an elliptical spray pattern or plume can be readily inserted for one which produces a conical spray pattern. In FIG. 8, spray heads 50A, 50B are shown closely adjacent to one another for drawing illustration purposes. All spray heads 50, (50A, 50B, 50C) will be mounted in a common plane to robotic arm 48 in a manner which will allow adjustable vertical spacing between spray heads (i.e., vertical spacing between spray heads 50A, 50B, 50C). For example, a spacing plate 59 with vertically spaced mounting holes 60 (or slots) to which the mounting plate 58 of each head 50 is attached can be provided. The spacing plate would then mount to robotic arm 48. Other arm mounting arrangements can be used. Also, each spray head 50 is equipped with an air knife 62. In the embodiment illustrated in FIG. 8, each spray head 50 has four air knives 62. It is important for the consistent operation and repeatability of the system, that a trailing knife edge of air follow the coating plume to assure the coating penetrates at least to the mid-point of channels 36.

Figure 7:
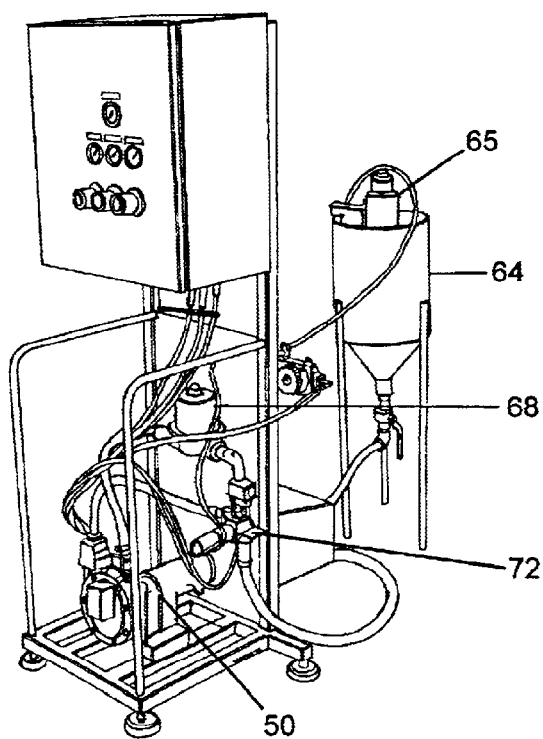
FIG. 7 is a perspective view of the slurry vat and one of the pumps used in the present invention; and, FIG. 8 is a perspective view of the spray heads of the subject invention mounted to the robotic arm.

Spray system 10 also includes a conventional slurry vat 64, pictorially depicted in FIG. 7, which has an agitator 65 for stirring the slurry contained therein. Slurry vat 64 functions as a reservoir at atmospheric pressure. Although the system is "closed", air is necessarily present. Slurry is supplied in a formulated form in closed containers shipped to the spray site which are emptied into slurry vat 64 and initially agitated for a set time (15 min) to assure consistency before use. Slurry vat 64 does not formulate the slurry but maintains the slurry in a mixed state. Also, there is a surge suppressor 68 (shown for drawing clarity purposes as surge suppressors 68A, 68B, 68C) in the slurry line to dampen out pulses generated by the pump.

In fluid communication with slurry vat 64 and the spray head 50 is a peristaltic pump 70. Because each spray head 50 has its own dedicated peristaltic pump 70, there are three peristaltic pumps 70A, 70B and 70C illustrated in the embodiment of FIG. 2.

Fluid pumps of the peristaltic type which operate to provide a moving region or regions of compression along the length of a compressible fluid conduit or tube are generally known in the art and will not be described in detail herein. As is well known, movement of the compressed region of the tubular conduit forces fluid ahead of the moving region (i.e., the pump side) and the action of the tube in returning to its uncompressed condition creates a partial vacuum which effects forward flow of the fluid from the region behind the compressed region (pump inlet suction). These pumps are termed "positive displacement pumps" because, for every angular displacement of the pump head, a known quantity of fluid is pumped and thus, the flow rate of the pump is directly related to its speed.

Peristaltic pumps are conventionally defined as either linear, such as disclosed in U.S. Pat. No. 2,877,714 to Sorg et al., U.S. Pat. No. 4,671,792 to Borsanyi, U.S. Pat. No. 4,728,265 to Cannon, etc. or the peristaltic pump can be of the rotary type such as described in U.S. Pat. No. 5,250,027 to Lewis at el., U.S. Pat. No. 4,688,595 to Srebnik et al., U.S. Pat. No. 6,062,829 to Ognier, U.S. Pat. No. 3,358,609 to Worth et al., etc. In the preferred embodiment, a rotary peristaltic pump is utilized. Rotary peristaltic pumps commonly include a motor driven peristaltic rotor mounted on a shaft extending out through the front wall of the pump housing. The peristaltic rotor carries an array of two or more circumferentially or angularly spaced rollers (schematically shown as reference numeral 46 in FIG. 2). The peristaltic rotor is designed to have a portion of a flexible tubing (schematically shown as reference numeral 47 in FIG. 2) of the feeding set wrapped part way around the roller array under tension thereagainst or confined between the rollers and an opposing arcuate surface. As the motor within the pump housing rotates the shaft on which the peristaltic rotor is mounted, the spaced apart rollers are sequentially brought into contact with the flexible tubing so that each revolution of the motor shaft and each roller, in turn, compresses a portion of the tubing to form an occlusion. The occlusion is advanced along the tubing as the peristaltic rotor turns and the roller advances along the tubing with the occlusion disappearing where the tubing diverges tangentially from the rotor. A predetermined amount of fluid is contained between successive occlusions so that a predetermined volume of fluid is amassed in a peristaltic manner through the tubing with each revolution of the rotor. Thus, a set quantity of fluid to be delivered may be regulated by controlling the rate of rotation of the rotor and the time duration of the revolutions.

The peristaltic pump was selected for the prior art system of FIG. 1 as well as the present invention depicted schematically in FIG. 2 for several reasons, principally because the delivery of the pump can (at least in theory) be controlled with high accuracy over a wide range of operating speeds. After all, the peristaltic pump was initially developed for medical applications to insure delivery of precise quantities of fluid to a patient. Another more subtle but important reason resides in the fact that with a peristaltic pump, at no time is the pump slurry in contact with any moving parts of a pump such as pistons, vanes, or rotors. The slurry, by definition, includes solids which will either adversely wear the pump or, conceivably, distort the slurry composition. The solids in any slurry system can and do "settle" notwithstanding system flow and pressure considerations. Solid variations processed by moving mechanical parts in a vane or piston pump can produce greater variations in pump output when compared to that of a peristaltic pump.

During operation of the system, the peristaltic pump 70 is operated at a constant speed set by PLC 52. In theory, the pump speed is determined as a function of the catalyst loading desired to be sprayed on radiator 20. That is, if the quantity of manganese oxide in a set volume of slurry is known, then the total quantity of slurry that must be deposited on the radiator is known. Accordingly, the number of revolutions of the pump to produce the total volume of slurry containing manganese oxide is known. The time for completing the spray pattern with spray heads 50 is also known and therefore, the speed of pump 70 is calculated and converted to a current draw for the pump motor which the PLC in the pump regulates in response to the current demand inputted by PLC 52. In practice, the calculation described will be used to establish an initial setting for each pump. However, the pump will be calibrated over an operating range of speeds determined from the calculation and the calculation modified by a calibration factor. In practice, the loading of dry coating (i.e., weight of dry coating per unit volume) on the radiator is calculated from the total geometric surface area and volume of the radiator. The amount of slurry to be applied to the radiator is calculated from the loading of dry coating, the length and width and depth of the radiator (volume), and the slurry solids. The slurry flow rate is calculated by the spray gun travel speed across the face of the radiator and the distance the spray gun increments down for each succeeding pass across the face of the radiator when spraying the radiator face. A similar calculation is used for spraying the periphery of radiator window 23. The peristaltic pump speed is set to achieve the desired slurry flow. Prior to coating, the slurry flow out of the gun is verified by measurement (i.e., "cup catch" test).

Because peristaltic pump 70 is always operating at a constant speed, a diverter valve schematically indicated as reference numeral 72 is provided which diverts the slurry back to slurry vat 64 when spray head 50 is not spraying and establishes fluid communication with spray head 50 for spraying. It is to be noted that diverter valves 72A, 72B, 72C are full on or full off. Either all the slurry is pumped to spray head 50 or all the slurry is returned to slurry vat 64. It must be noted that the flow control valve 72 is shown as depicted in the schematic (for both FIGS. 1 and 2) for drawing clarity purposes only. The valve shown is a three-way valve and the system can function as shown. In practice, the valve is a two-way valve positioned in the spray head or robotic arm and the return line runs from the valve through the arm. The needle valve in the sprayhead (i.e., the needle valve in atomizing outlet 54) acts as a valve and operates in conjunction with the two-way return valve providing on-off flow to either head or return. This valving arrangement was used in prior art system FIG. 1 (and is also used in the preferred embodiment of the invention). Other on-off valving arrangements can be used so that the slurry flow is either all "on" to the spray nozzle and "off" to the return or all "on" to the return and "off" to the spray nozzle.

Each spray head 50 is also in fluid communication with a source of shop air 74 vis-a-vis pressure regulator valves 75A, 75B, 75C. All valves are under control of PLC 52 to assure that spray heads receive pressurized air and pumped slurry. Also, to positively assure consistent atomization of the slurry from spray head 50, a slurry pressure regulator valve (not shown) by itself, or alternatively, tied to air pressure regulator valve 75 can be employed. For purposes of this invention, air to spray heads 50 can be regulated by pressure or flow or flow and pressure.

Some of assignee's prior art systems have used one pump valved to provide slurry to multiple spray heads mounted on a robotic arm. It was determined that improved results occurred when each spray head 50 is in fluid communication with its own dedicated peristaltic pump 70. Without wishing to be bound by any theory, there may be several reasons why a dedicated pump for each head gives improved results. At noted, the solid concentration of the slurry within the flexible tube of the peristaltic pump can vary. If solids vary, the roller(s) will experience a change in resistance as the roller(s) progressively flattens the tube to move the occlusion through the tube. Thus, the current draw regulated by the pump's controller to maintain the constant pump speed dictated by PLC 52 is constantly adjusting to compensate for the resistance variation attributed to variations in solids of the slurry. Again, this has been determined to be somewhat inherent in the system and the solids will somewhat settle, sometimes almost to the point of plugging, flush and settle again. When a larger peristaltic pump is employed, increase in capacity is achieved by adding additional tubes and rollers. Solid concentration in the tubes can vary, but the pump controller can no longer rotate the roller(s) for one tube independently of the rollers for the other tube. The result is a variation in slurry output between the tubes which is sufficient to produce inconsistent spray output at spray heads 50A, 50B, 50C. The situation can become worse if some of the tubes wear at different rates producing different resistance to being squeezed by the pump's roller(s). Again, output from the different tubes can vary producing inconsistencies in the sprayed slurry. This is avoided in the present invention by using a separate or dedicated pump for each spray head. It is to be understood that each dedicated pump has only one flexible tube which is progressively squeezed by the single roller(s). It should also be noted that a large capacity peristaltic pump could be specially constructed to have only one large flexible tubing sufficient to pump large occlusions along the tubing. While such a large capacity, peristaltic pump does not appear to be commercially available, it is believed that if such a pump was available, the increased size of the flexible tubing would produce a corresponding decrease in sensitivity to detect changes in resistance attributed to solid variations in the slurry.

The system as disclosed sets a pump speed correlated to the desired catalyst loading and relies on the peristaltic pump to deliver a fixed quantity of catalyst to the spray head. Conceptually, a mass flow controller in the pump outlet could conceivably control the entire system. If a mass flow controller could be used, then any pump design controlled by the mass flow controller could be used provided the sensitivities of the system could account for the inherent variations in the solids content of the slurry while the system operates. Early coating systems tried by the inventors had mass flow controllers with recirculation systems which continuously returned a varying portion of the slurry to vat depending on the mass flow required by the spray head. The mass flow delivered was calculated by the difference in flows sensed by the return lines and the flow inputted to the head. This system of control proved unacceptable since it did not have the necessary sensitivity.

In the present system, diverter valves 72 are either "on" or "off" so it is not possible to regulate the flow of the pump by a mass flow controller using a calculated flow difference. However, a mass flow meter (not shown) is used to sense the pump output. This is done not to control the system but to monitor the system should somehow the pump output at a constant speed undergo excessively wide fluctuations in which case a system alarm will trigger. Based on observations of the behavior of the mass flow meter, it is believed that air entrained in the slurry affects the mass flow device when the valves are actuated. If a mass flow controller regulating a valve dump to return (for pump flows beyond a set level when spraying, thus eliminating mass flow calculation by difference readings) were employed, the air entrainment in the slurry would distort the mass flow controller's reading on valve actuation to a point beyond the sensitivities required by the system. To some extent, the sensitivity of the mass flow controller is a function of the design of the mass flow controller. If a mass flow controller were developed with the desired sensitivity, an improvement in control of the system disclosed herein could be achieved. However, the system as disclosed, without the use of a mass flow controller, is expected to achieve (based on prior experiences) coating consistency equaling 95% or better of the calculated loading.

Referring now to FIGS. 5A and 5B, FIG. 5B is a schematic illustration of spray heads 50 oriented 90° from front radiator face 22 depicted in FIG. 5B. In the spray radiator face position, spray heads 50A and 50B are vertically aligned and offset from one another as schematically shown in FIG. 5B. Robotic arm 48 will move both spray heads 50A, 50B in a horizontal pass or sweep position which would extend from a position adjacent one of the side peripheral edges of radiator window 23 to a position adjacent the opposite side peripheral edge of window 23 as indicated by the arrow drawn in FIG. 5 designated with reference letter A. Assuming that the first horizontal sweep occurs in fin channels 36 adjacent but slightly less than the top of radiator 20, robotic arm 48 will index both heads vertically down an indexed distance before starting the second sweep. The indexed distance is less than (and never greater than or equal to) the diameter of the conical spray pattern formed by spray heads 50 at the point where the spray pattern contacts front or rear face 32, 33 and is schematically indicated by reference dimension "D". The indexing continues until head 50A reaches the initial position of head 50B. If the lowest row of fins is coated by spray head 50B before spray head 50A is vertically indexed to a position which equals that row of radiator fins initially coated by spray head 50B, then spray head 50B is shut off by actuating diverter valve 72B until spray head 50A completes its indexed pattern. Similarly, if additional radiator structure is to be coated by the lowest spray head 50B after spray head 50A reaches the start position of spray head 50B, then diverter valve 72A closes fluid communication from pump 70A to spray head 50A and the movement pattern of robotic arm 48 is adjusted to insure that the spray pattern developed by lowest most spray head 50B adequately covers the additional radiator fin structure. If the thickness of the radiator increases for a certain area, two horizontal sweeps can be had for the thicker area while the other gun (coating the thinner section) is shut off on the second horizontal sweep. The speed of robotic arm 48 can be varied for the second horizontal sweep to assure correct coating deposition.

While spray heads 50A, 50B could be vertically offset from one another at a precise distance to assure optimum spraying of a specific radiator configuration so that each spray head 50A, 50B complete the last horizontal sweep at the same time, it is not necessary for this to occur because valving 73 allows each head to be independently controlled by PLC 52. That is, adjustments in the spray system dictated by the shape or uneven configuration of radiator window structure are preferably effected by adjusting the speed of the arm and valving in and out of certain spray heads. Conceptually, additional adjustments can be made by pump speed because each head has its own peristaltic pump. This, however, is not preferred because upset of solids in the slurry can result. It is preferred that all pumps run continuously at the same speed and the speed be set at a sufficiently high rate to minimize or null any "dead band" effects of the peristaltic pump (start and stop of successive cycles).

As noted above, it is not necessary to mask the radiator frame with the present invention. This is accomplished by means of adjusting air pressure to air cap 57 to produce an elliptical spray plume. Because of the narrow elliptical pattern that can be produced by air cap 57, robotic arm 48 can swivel spray head 50C 360° and can trace the periphery of radiator window 23 so that a peripheral edge coating of radiator window 23 is applied while diverter valves 72A, 72B direct output of pumps 70A, 70B to return thus preventing actuation of spray heads 50A, 50B. The elliptical spray plume forms a coating margin or border 45 indicated by dot-dash line 45 in FIG. 5A and when the face of radiator window 23 is sprayed (as described above), the sweep of robotic arm 48 does not extend (vertically or horizontally) beyond border 45. Typically, window border 45 (which usually will be applied before the face of the window is coated) will be accomplished in horizontal and vertical sweeps of robotic arm 48 with the major axis of the elliptical spray plume orientated to match the wide and narrow portions of the radiator window and the speed of robotic arm 48 adjusted to achieve even catalyst loading.

In all coating applications, all four air knives 62 are operable to assure penetration of the catalyst at least to the center of fin channels 36. It should be clear, however, that only two of the four air knives 62 which follow spray head 50 in any horizontal sweep of robotic arm 48 are principally responsible for insuring the coating penetrates to the middle of the fin channel 36. Air supplied to air knife 62 is from shop air 74 at pressures from 60 to 100 psig.

In one sense, this invention could be applicable to any solid/liquid slurry spray coated onto a substrate. In a more specific inventive sense, the system described was developed for the specific application of ozone depleting catalysts in slurry form to radiators which have specific characteristics that the inventive system addresses to achieve the coating of the radiators. Nevertheless, in this specific sense, the invention is not limited to any specific formulation of the catalyst or the slurry which can be formulated over a wide family range.

That is, the ozone depleting catalyst comprises manganese compounds including i) manganese dioxide, ii) non stoichiometric manganese dioxide (e.g., $MnO_{(1.5-2.0)}$), and/or iii) $Mn_2O_3$. Preferred manganese dioxides, which are nominally referred to as $MnO_2$ have a chemical formula wherein the molar ratio of manganese to oxide is about from 1.5 to 2.0, such as $Mn_8O_{16}$. Up to 100 percent by weight of manganese dioxide $MnO_2$ can be used in catalyst compositions to treat ozone. Alternative compositions which are available comprise manganese dioxide and compounds such as copper oxide alone or copper oxide and alumina.

Useful and preferred manganese dioxides are alpha manganese dioxides nominally having a molar ratio of manganese to oxygen of from 1 to 2. Useful alpha manganese dioxides are disclosed in U.S. Pat. No. 5,340,562 to O'Young, et al. For the purposes of the present invention, the preferred alpha manganese dioxide is a 2×2 tunnel structure which can be hollandite ($BaMn_8O_{16} \cdot xH_2O$), cryptomelane ($KMn_8O_{16} \cdot xH_2O$), manjiroite ($NaMn_8O_{16} \cdot xH_2O$) and coronadite ($PbMn_8O_{16} \cdot xH_2O$).

It has been found that the use of compositions comprising the cryptomelane form of alpha manganese oxide, which also contain a polymeric binder can result in greater than 50%, preferably greater than 60% and most preferably from 75–85% conversion of ozone in a concentration range of from 0 to 400 parts per billion (ppb) and an air stream moving across a radiator at space velocity of from 200,000 to 1.6 million reciprocal hours, and preferably, from 300,000 to 650,000 reciprocal hours.

The preferred cryptomelane can be made by reacting a manganese salt including salts selected from the group consisting $MnCl_2$, $Mn(NO_3)_2$, $MnSO_4$ and $Mn(CH_3COO)_2$ with a permanganate compound. Cryptomelane is made using potassium permanganate; hollandite is made using barium permanganate; coronadite is made using lead permanganate; and manjiroite is made using sodium permanganate. It is recognized that the alpha manganese dioxide useful in the present invention can contain one or more of hollandite, cryptomelane, manjiroite or coronadite compounds. Even when making cryptomelane minor amounts of other metal ions such as sodium may be present. Useful methods to form the alpha manganese dioxide are described in the above reference which is incorporated by reference. A preferred method of making cryptomelane useful in the present invention comprises mixing an aqueous acidic manganese salt solution with a potassium permanganate solution. The acidic manganese salt solution preferably has a pH of from 0.5 to 3.0 and can be made acidic using any common acid, preferably acetic acid at a concentration of from 0.5 to 5.0 normal and more preferably from 1.0 to 2.0 normal. The mixture forms a slurry which is stirred at a temperature range of from 50° C. to 110° C. The slurry is filtered and the filtrate is dried at a temperature range of from 75° C. to 200° C. The resulting cryptomelane crystals have a surface area of typically in the range of from 150 $m^2/g$ to 350 $m^2/g$.

The above is only a general description of the manganese oxide catalyst slurry formulations used in the inventive spray systems. Specific catalyst slurry formulations are, as noted above, set forth in assignee's U.S. Pat. Nos. 5,422,331; 6,340,066; and WO publications 00/13772; 13773 and 13790, all of which are incorporated herein and are made a part hereof insofar as they describe the formulation of the catalyst slurry compositions used in the inventive spray system. For example, the binder specifications in the references, which is one of the distinguishing characteristics of a catalyst in slurry form, are incorporated herein.

The system has been described as applying a catalyst coating in a single spraying application. Because of the environmental conditions that a vehicular radiator is exposed to, the assignee has developed a protective coating which is typically applied as an overcoat to the catalyst coated radiator. The invention contemplates application of the porous overcoat by the system and methodology described herein to apply the manganese oxide catalyst as a coating to the radiator. This is a porous, protective overcoat that prevents atmospheric degrading contaminants, which can lead to masking, fouling and/or poisoning the catalyst composition, from interacting with the catalyst composition. The porous protective overcoat traps and holds airborne particulates, high molecular weight hydrocarbons, aerosols, water borne salts and catalyst deactivating gases such as $SO_X$ from contacting the manganese oxide composition underneath. The porous overcoat is dense enough to trap contaminants but porous enough to allow free passage of the air to the catalyst for ozone conversion. The preferred overcoat is generally aluminum oxide, and preferably, a high surface area silica containing aluminum oxide and silica containing high surface area alumina. Reference should be had to assignee's U.S. Pat. No. 6,190,627 to Hoke et al., granted Feb. 20, 2001. The '627 patent is incorporated by reference herein and made a part hereof for its description of the catalyst coating formulations of the porous overcoat, specifically, its formulation in slurry form, so that details of the chemical formulations of the protective overcoat do not have to be repeated herein. For example, the latex binder formulations for the protective alumina overcoat is different from that of the manganese oxide slurry. The coating loading of the protective overcoat is less than the coating loading of the manganese oxide catalyst (i.e., 0.22 $g/in^3$ to 0.44 $g/in^3$; 0.18 $g/in^3$ to 0.35 $g/in^3$; 0.22 $g/in^3$ to 0.38 $g/in^3$). Generally, the mean particle size of the metal oxide (manganese oxide) of the ozone depleting catalyst (whether or not a protective coating is applied) is five μm (microns) or less, and preferably, less than one micron. The mean particle size of the metal oxide (alumina oxide) of the protective coating can range from about 10 μm (microns) or less, but preferably, is about 5 μm or less.

The invention has been described with reference to a preferred embodiment. In this regard, the invention has been specifically explained with reference to its unique ability to consistently and accurately apply a manganese oxide, ozone depleting catalyst slurry to a vehicular radiator. However, the coating method, as described, can provide a methodology for coating a wide variety of objects or substrates with catalyst slurry formulations, other than the ozone depleting catalysts of the preferred embodiment. Additionally, the invention can apply the overcoat as described above whether the overcoat be viewed as a catalyst, because it has catalyst properties, or not. Also, in accordance with the broader scope of the invention, a pump, such as a gear pump with flow meter, could conceivably be substituted for the peristaltic pump. Improved results could be obtained with a dedicated gear pump for each spray head when compared to results obtained from a single gear pump valved to multiple spray heads. However, it is not believed that the gear pump will produce the consistent results obtained with a peristaltic pump. Further modifications and alterations will occur to those skilled in the art upon reading and understanding the Detailed Description of the Invention set forth herein. It is intended to include all such modifications and alterations insofar as they come within the scope of the present invention.

Having thus defined the invention, it is claimed:

1. A method for applying a catalyst coating to a vehicular radiator having a frame forming a window, a plurality of tubular conduits within the window for carrying a coolant and fins between the conduits having louvers formed therein, said method comprising the steps of:
   a) providing an agitated vat containing a slurry of said catalyst;
   b) providing a plurality of spray heads mounted in spaced relationship to a robotic arm movable relative to said radiator;
   c) providing for each spray head a source of pressurized air regulated by flow and/or pressure when valved into fluid communication with a spray head;
   d) providing for each spray head a separate pump for pumping said slurry from said vat to an associated spray head;
   e) controlling each pump to operate at a generally constant set speed;
   f) valving said pressurized air and the slurry from said pumps into fluid communication with said spray heads to produce an atomized fan shaped slurry spray from each spray head;
   g) maintaining said valved communication of air and slurry to said spray heads for a set time sufficient to allow said arm to complete a set movement pattern for spraying one face side of said radiator window with said slurry penetrating to at least the center depth of the fins; and,
   h) repeating steps (f) and (g) to spray the opposite face side of said radiator window.

2. The method of claim 1 wherein said catalyst is manganese oxide and each pump is a peristaltic pump.

3. The method of claim 2 wherein said spray pattern includes, without masking the window of said radiator, indexing said spray heads vertically up or down at the completion of a horizontal sweep of said arm, said horizontal sweep extending from a position adjacent one side edge of said window to a position adjacent the opposite side edge of said window, said spray pattern generally conical; said index step less than the diameter of said spray pattern at the face surface of said radiator, said plurality of spray heads including a first and second spray head with said second spray head positioned a set distance below said first spray head and said indexing step continuing until one of said spray heads is vertically indexed to the vertical position occupied by the other spray head at the start of the spray cycle.

4. The method of claim 3 further including the step of forming an elliptical spray pattern for one of said spray heads, directing said arm to move said one spray head to spray at each radiator face side a border pattern at the peripheral edge of said window by horizontal and vertical passes of said spray head forming said elliptical pattern while fluid communication of said slurry to the other spray heads is stopped.

5. The method of claim 3 wherein select spray heads are valved only into and out of fluid communication with said peristaltic pump at set times during said arm movement pattern, each pump pumping its entire output either to its associated spray head or to said slurry vat.

6. The method of claim 5 wherein said slurry is recirculated back to said vat for any given peristaltic pump not in fluid communication with its corresponding spray head.

7. The method of claim 5 further including the step of directing a knife edge of air against the radiator face immediately following spraying said slurry onto said radiator face to assure penetration of said slurry into channels formed between said conduits and fins.

8. The method of claim 5 further including the step of providing a mass flow controller at the outlet of each pump to measure and control the flow rate of each pump.

9. The method of claim 5 wherein said catalyst in slurry form is selected from the group consisting of i) manganese dioxide, ii) non stoichiometric manganese dioxide, and iii) $Mn_2O_3$.

10. The method of claim 9 wherein said manganese dioxide comprises the cryptomelane form of alpha manganese oxide with a surface area between 150 $m^2/g$ to 350 $m^2/g$.

11. The method of claim 10 further including the steps of providing a protective coating slurry in said vat and repeating steps (a) to (h) to produce a protective overcoat over said catalyst coating.

12. The method of claim 14 wherein said protective coating is alumina oxide.

13. The method of claim 5 wherein said catalyst comprises metal oxides in said slurry.

14. The method of claim 5 further including the steps of washing and drying each radiator prior to spraying and drying each radiator after spraying, said drying step occurring at an elevated temperature and in the absence of burner products of combustion.

15. The method of claim 14 further including the steps of weighing said radiator before and after spraying said radiator to determine the quantity of catalyst deposited onto said radiator.

16. A method for applying a catalyst coating to a vehicular radiator having a frame defining a window formed thereby, a plurality of tubular conduits within the window for carrying a coolant and fins between the conduits having louvers formed therein, said method comprising the steps of:

a) providing a slurry of said catalyst in an agitating vat;

b) providing at least two spray heads mounted for common movement to a robotic arm, each spray head receiving a source of pressurized air;

c) providing a separate pump for each spray head for pumping said slurry from said vat to said spray head;

d) controlling each pump to operate at a generally constant speed;

e) independently valving said pumped slurry into fluid communication with said spray heads for a discreet time sufficient to allow said arm to move said spray head through a set spray movement for spraying said slurry onto one face side of said radiator window with said slurry penetrating at least to the middle of said fins; and, f) repeating step (e) for the opposite window face side of said radiator.

17. The method of claim 16 wherein said catalyst is manganese oxide and each pump is a peristaltic pump.

18. The method of claim 17 wherein said slurry is recirculated back to said agitating vat when said peristaltic pump is not in fluid communication with said spray head.

19. The method of claim 18 wherein said spray pattern includes, without masking the window of said radiator, indexing said spray heads vertically up or down at the completion of a horizontal sweep of said arm, said horizontal sweep extending from a position adjacent one side edge of said window to a position adjacent the opposite side edge of said window, said spray pattern generally conical; said index step less than the diameter of said spray pattern at the face surface of said radiator, said plurality of spray heads including a first and second spray head with said second spray head positioned a set distance below said first spray head and said indexing step continuing until one of said spray heads is vertically indexed to the vertical position occupied by the other spray head at the start of the spray cycle.

20. The method of claim 19 further including the step of forming an elliptical spray pattern for one of said spray heads, directing said arm to move said one spray head to spray at each radiator face side a border pattern at the peripheral edge of said window by horizontal and vertical passes of said spray head forming said elliptical pattern while fluid communication of said slurry to the other spray heads is stopped.

21. A method for coating the window opening formed within the frame of a vehicular radiator having tubular conduits and louver fins therein with an ozone depleting catalyst comprising the steps of:

a) providing at least two spray heads mounted for common movement on a robotic arm;

b) providing pressurized valved communication of said ozone depleting catalyst in slurry form and air to each spray head;

c) causing only one of said spray heads to form an elliptical spray pattern of said slurry while preventing the other spray heads from operating;

d) directing at each side of said radiator an elliptical catalyst spray plume from said one spray head by moving said one spray head in horizontal and vertical directions about the periphery of said window to form a border about said window of sprayed catalyst; and, e) coating the remainder of said window by spraying said slurry onto the window of said radiator between the border coated in step (e).

22. The method of claim 21 wherein each spray head has a separate peristaltic pump with one deformable flexible tubing biased by rollers and a diverter valve for recirculating catalyst slurry when pump output of any given pump is not directed to an associated spray head and independently controlling each diverter valve when spraying said radiator window.

23. The method of claim 22 further including the step of directing a knife stream of air against the window opening following spraying of said catalyst slurry onto the face surface of said window.

24. The method of claim 23 wherein said catalyst in slurry form is selected from the group consisting of i) manganese dioxide, ii) non stoichiometric manganese dioxide, and iii) $Mn_2O_3$.

25. The method of claim 24 wherein said manganese dioxide comprises the cryptomelane form of alpha manganese oxide with a surface area between 150 $m^2/g$ to 350 $m^2/g$.

* * * * *